United States Patent
Kim et al.

(10) Patent No.: US 10,305,100 B2
(45) Date of Patent: May 28, 2019

(54) COMPOSITE CATHODE ACTIVE MATERIAL, AND CATHODE AND LITHIUM BATTERY INCLUDING THE MATERIAL

(75) Inventors: So-yeon Kim, Suwon-si (KR); Kyu-sung Park, Suwon-si (KR); Young-min Choi, Suwon-si (KR); Won-chang Choi, Yongin-si (KR); Min-sang Song, Seongnam-si (KR); Gue-sung Kim, Yongin-si (KR); Ryoung-hee Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 909 days.

(21) Appl. No.: 13/489,566

(22) Filed: Jun. 6, 2012

(65) Prior Publication Data

US 2013/0071753 A1    Mar. 21, 2013

(30) Foreign Application Priority Data

Sep. 16, 2011    (KR) ........................ 10-2011-0093645

(51) Int. Cl.
| H01M 4/48 | (2010.01) |
| H01M 4/36 | (2006.01) |
| H01M 4/50 | (2010.01) |
| H01M 4/52 | (2010.01) |
| H01M 4/58 | (2010.01) |
| H01M 4/485 | (2010.01) |
| H01M 4/505 | (2010.01) |
| H01M 4/525 | (2010.01) |
| H01M 10/052 | (2010.01) |

(52) U.S. Cl.
CPC ........... *H01M 4/485* (2013.01); *H01M 4/364* (2013.01); *H01M 4/505* (2013.01); *H01M 4/525* (2013.01); *H01M 4/58* (2013.01); *H01M 4/5825* (2013.01); *H01M 10/052* (2013.01)

(58) Field of Classification Search
None
See application file for complete search history.

(56) References Cited

U.S. PATENT DOCUMENTS 5,827,331 A * 10/1998 Block ................... H01M 4/131
                                                29/623.5
6,677,082 B2 * 1/2004 Thackeray ........... C01G 23/002
                                                423/599

(Continued)

FOREIGN PATENT DOCUMENTS

| JP | 2003-017057 A | 1/2003 |
| JP | 2008-198596 A | 8/2008 |

(Continued)

OTHER PUBLICATIONS

Korean Office Action dated Aug. 24, 2017.

*Primary Examiner* — Barbara L Gilliam
*Assistant Examiner* — Angela J Martin
(74) *Attorney, Agent, or Firm* — Lee & Morse, P.C.

(57) ABSTRACT

A composite cathode active material including an overlithiated metal oxide having a layered structure, a material having an olivine structure, and one or more of: an inorganic material, and nitrogen atoms doped in the material having an olivine structure. The inorganic material includes a nitride or carbide of a non-transition metal. The composite cathode active material may be included in a cathode, and the cathode may be included in a lithium battery.

22 Claims, 4 Drawing Sheets

(56) References Cited

U.S. PATENT DOCUMENTS

| | | | |
|---|---|---|---|
| 8,932,481 B2* | 1/2015 | Park et al. | 252/182.1 |
| 9,077,036 B2* | 7/2015 | Senoue | H01M 4/485 |
| 2004/0048157 A1* | 3/2004 | Neudecker | H01M 4/0421 |
| | | | 429/231.2 |
| 2007/0245546 A1 | 10/2007 | Le Cras et al. | |
| 2009/0023073 A1* | 1/2009 | Okada | H01M 2/145 |
| | | | 429/246 |
| 2011/0042609 A1* | 2/2011 | Park et al. | 252/182.1 |
| 2011/0212359 A1* | 9/2011 | Dai | H01M 10/0525 |
| | | | 429/149 |
| 2013/0055559 A1* | 3/2013 | Slocum | H01M 4/0478 |
| | | | 29/623.1 |
| 2013/0084474 A1* | 4/2013 | Mills | H01M 4/9016 |
| | | | 429/9 |
| 2013/0216902 A1* | 8/2013 | Choy | B60L 11/1879 |
| | | | 429/211 |
| 2014/0030623 A1* | 1/2014 | Chiang | H01M 8/225 |
| | | | 429/434 |
| 2014/0154593 A1* | 6/2014 | Rojeski | H01M 4/8626 |
| | | | 429/405 |

FOREIGN PATENT DOCUMENTS

| | | | | |
|---|---|---|---|---|
| JP | 2009-123715 A | 6/2009 | | |
| JP | 2010-251060 | * 11/2010 | | H01M 10/0525 |
| JP | 2010-251060 A | 11/2010 | | |
| KR | 10-2003-0040870 A | 5/2003 | | |
| KR | 10-2007-0039555 | 4/2007 | | |

* cited by examiner

COMPOSITE CATHODE ACTIVE MATERIAL, AND CATHODE AND LITHIUM BATTERY INCLUDING THE MATERIAL

BACKGROUND

1. Field

Embodiment relate to a composite cathode active material, and a cathode and a lithium battery including the material.

2. Description of the Related Art

Lithium metal oxides, may be used as a cathode active material for a lithium battery. The lithium metal oxides may be relatively expensive and have limited electric capacity. If a relatively high charge voltage is applied to a lithium battery using a lithium metal oxide as a cathode active material, the lithium may be removed from the lithium metal oxide, which may result in a reduced stoichiometric amount of lithium relative to the metal in the lithium metal oxide. As a result, the lithium metal oxide having a relatively low amount of lithium may be structurally unstable and the electric capacity of the oxide may rapidly decrease as charge and discharge cycles are performed.

SUMMARY

Embodiments are directed to a composite cathode active material, including an overlithiated metal oxide having a layered structure, a material having an olivine structure, and one or more of: an inorganic material including a nitride or carbide of a non-transition metal, and nitrogen atoms doped in the material having an olivine structure.

A content of the overlithiated metal oxide may be in a range of about 5 wt % to about 95 wt % of a total weight of the composite cathode active material.

A content of the overlithiated metal oxide may be in a range of about 40 wt % to about 60 wt % of the total weight of the composite cathode active material.

The overlithiated metal oxide may include a compound represented by Chemical Formula 1:

$$Li[Li_xMe_y]O_{2+d},  \quad \text{<Chemical Formula 1>}$$

where $x+y=1$, $0<x<1$, $0\leq d\leq 0.1$, and Me is one or more of Mn, V, Cr, Fe, Co, Ni, Zr, Re, Al, B, Ge, Ru, Sn, Ti, Nb, Mo, and Pt.

The overlithiated metal oxide may include a compound represented by Chemical Formula 2:

$$Li[Li_xNi_aCo_bMn_c]O_{2+d},  \quad \text{<Chemical Formula 2>}$$

where $x+a+b+c=1$, $0<x<1$, $0<a<1$, $0<b<1$, $0<c<1$, and $0\leq d\leq 0.1$.

The material having an olivine structure may include a lithium metal oxide represented by Chemical Formula 3:

$$Li_xM_yM'_zPO_{4-d}X_d,  \quad \text{<Chemical Formula 3>}$$

where $0.9\leq x\leq 1.1$, $0\leq y\leq 1$, $0\leq z\leq 1$, $1.9\leq x+y+z\leq 2.1$, $0\leq d\leq 0.2$, M is one or more of Fe, Mn, Ni, and Co, M' is one or more of Mg, Ca, Sr, Ba, Ti, Zr, Nb, Mo, W, Zn, Al, and Si, and X is one or more of S and F.

The material having an olivine structure may include one or more of $LiFePO_4$, $LiFe_{1-a}Mn_aPO_4$ ($0<a<1$), and $LiMnPO_4$.

The material having an olivine structure may be doped with nitrogen atoms, and a region doped with nitrogen atoms in the material having an olivine structure may exist in a crystalline phase.

The material having an olivine structure may include a metal with an oxidation number of +2 and a metal with an oxidation number of +3, and a content of the metal with an oxidation number of +3 in the material having an olivine structure may be about 5 wt % or less of a total content of the metal with an oxidation number of +2 and the metal with an oxidation number of +3 in the material having an olivine structure.

The material having an olivine structure may exhibit a nitrogen peak having a binding energy range of about 398 eV to about 400 eV and an oxygen peak having a binding energy range of about 530 eV to about 534 eV in an X-ray photoelectron spectrum, and a ratio of an area of the nitrogen peak to an area of the oxygen peak may be about 1:100 or more.

The ratio of the area of the nitrogen peak to the area of the oxygen peak may be about 1:100 to about 20:100.

The material having an olivine structure may exhibit a nitrogen peak having a binding energy range of about 398 eV to about 400 eV and a phosphorus peak having a binding energy range of about 132 eV to about 136 eV in an X-ray photoelectron spectrum, and a ratio of an area of the nitrogen peak to an area of the phosphorus peak may be about 1:100 or more.

The ratio of the area of the nitrogen peak to the area of the phosphorus peak may be about 1:100 to about 30:100.

The material having an olivine structure may exhibit a nitrogen peak having a binding energy range between about 396 eV and less than about 398 eV.

The material having an olivine structure may include a coating layer that includes conductive carbon.

The composite cathode active material may include the inorganic material, and the inorganic material may include a nitride or carbide of one or more elements selected from the group of: group 2, group 13, group 14, and group 15 of the Periodic Table.

The composite cathode active material may include the inorganic material, and the inorganic material may include a nitride or carbide of a metalloid element.

The composite cathode active material may include the inorganic material, and the inorganic material may be one or more of boron nitride (BN), boron carbide ($B_4C$), silicon nitride ($Si_3N_4$), and silicon carbide (SiC).

The composite cathode active material may include the inorganic material, and the inorganic material may include boron.

The composite cathode active material may include the inorganic material, and the inorganic material may include one or more of amorphous boron nitride, boron nitride having a cubic crystal structure, boron nitride having a hexagonal crystal structure, and boron nitride having a wurtzite crystal structure.

The composite cathode active material may include the inorganic material, and the inorganic material may include one or more of a nanoparticle, a nanofiber, a nanomesh, and a nanotube.

The composite cathode active material may include the inorganic material, and the inorganic material may have a Mohs hardness higher than a Mohs hardness of a lithium metal oxide having an olivine structure.

The composite cathode active material may include the inorganic material, and the inorganic material may have a Mohs hardness of about 1 or more.

The composite cathode active material may include the inorganic material, and the inorganic material may have an electrical conductivity lower than an electrical conductivity of amorphous carbon.

The composite cathode active material may include the inorganic material, and the inorganic material may have an electrical conductivity of about $10^{-1}$ S/cm or less.

A cathode may include the composite cathode active material.

A lithium battery may include the composite cathode active material in a cathode.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
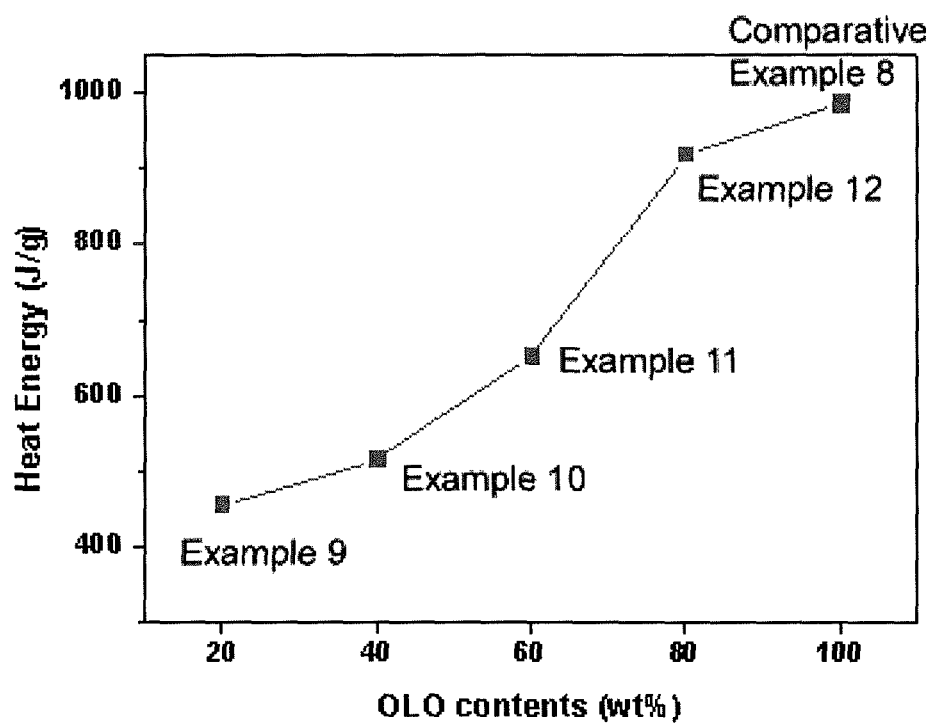
FIG. 1 illustrates the results of dynamic scanning calorimeter (DSC) measurements on lithium batteries prepared in Examples 9 to 12 and Comparative Example 8.

Korean Patent Application No. 10-2011-0093645, filed on Sep. 16, 2011, in the Korean Intellectual Property Office, and entitled: "Composite Cathode Active Material, and Cathode and Lithium Battery Including the Material," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, embodiments of a composite cathode active material, a cathode including the composite cathode active material, and a lithium battery including the composite cathode active material will be described in greater detail.

The composite cathode active material may include an overlithiated metal oxide having a layered structure, a material having an olivine structure, and one or more of: an inorganic material, and nitrogen atoms doped in the material having an olivine structure. The composite cathode active material may include the inorganic material without the nitrogen atoms doped in the material having an olivine structure, or the composite cathode active material may include the nitrogen atoms doped in the material having an olivine structure without the inorganic material, or the composite cathode active material may include both the nitrogen atoms doped in the material having an olivine structure, and the inorganic material.

The inorganic material may be a nitride or carbide of a non-transition metal. The inorganic material may be included in a coating layer on the material having an olivine structure.

In the composite cathode active material, a content of the overlithiated metal oxide may be in a range of about 5 wt % to about 95 wt % of a total weight of the composite cathode active material. For example, the content of the overlithiated metal oxide may be in a range of about 40 wt % to about 60 wt % of the total weight of the composite cathode active material. Thermal stability and high C-rate characteristics may be improved if the content of the overlithiated metal oxide is in the foregoing range. When the content of the overlithiated metal oxide is too high, thermal stability may decrease, and when the content of the overlithiated metal oxide is too low, high C-rate characteristics may degrade.

The overlithiated metal oxide may include a material represented by Chemical Formula 1.

$\text{Li}[\text{Li}_x\text{Me}_y]\text{O}_{2+d}$ <Chemical Formula 1> where $x+y=1$, $0<x<1$, $0\leq d\leq 0.1$, and Me may be one or more of manganese (Mn), vanadium (V), chromium (Cr), iron (Fe), cobalt (Co), nickel (Ni), zirconium (Zr), rhenium (Re), aluminium (Al), boron (B), germanium (Ge), ruthenium (Ru), tin (Sn), titanium (Ti), niobium (Nb), molybdenum (Mo), and platinum (Pt).

The overlithiated metal oxide may include a material represented by Chemical Formula A, where LiMe'O$_3$ and LiMe"O$_2$ may exist as a solid solution (e.g., LiMe'O$_3$ and LiMe"O$_2$ may be in different phases).

$x\text{LiMe'O}_3\text{-}(1-x)\text{LiMe"O}_2$ <Chemical Formula A> where $0<x<1$, Me' may be one or more of Mn, Zr, and Ti, and Me" may be one or more of Ni, Co, Mn, Cr, Fe, V, Al, magnesium (Mg), and Ti.

The overlithiated metal oxide may include a material represented by Chemical Formula 2.

$\text{Li}[\text{Li}_x\text{Ni}_a\text{Co}_b\text{Mn}_c]\text{O}_{2+d}$ <Chemical Formula 2> where $x+a+b+c=1$, $0<x<1$, $0<a<1$, $0<b<1$, $0<c<1$, $0\leq d\leq 0.1$.

The overlithiated metal oxide may be doped with a foreign element. The doped foreign element is not particularly limited and any foreign element may be used. For example, a foreign element that improves the thermal stability of the overlithiated metal oxide may be used.

The material having an olivine structure may include a lithium metal oxide represented Chemical Formula 3.

$\text{Li}_x\text{M}_y\text{M'}_z\text{PO}_{4-d}\text{X}_d$ <Chemical Formula 3> where $0.9\leq x\leq 1.1$, $0\leq y\leq 1$, $0\leq z\leq 1$, $1.9\leq x+y+z\leq 2.1$, $0\leq d\leq 0.2$, M is one or more of Fe, Mn, Ni, and Co, M' is one or more of Mg, calcium (Ca), strontium (Sr), barium (Ba), Ti, Zr, Nb, Mo, tungsten (W), zinc (Zn), Al, and silicon (Si), and X is one or more of sulphur (S) and fluorine (F).

The material having an olivine structure may be, e.g., one or more of LiFePO$_4$, LiFe$_{1-a}$Mn$_a$PO$_4$ ($0<a<1$), and LiMnPO$_4$.

The material having an olivine structure may be doped with nitrogen atoms. Doping the material having an olivine structure with nitrogen atoms may improve the conductivity of the material having an olivine structure. The material having an olivine structure may be doped such that only a portion of the material includes the doped nitrogen atoms. Without being bound by theory, possible reasons that the conductivity of the material having an olivine structure may be improved by doping with nitrogen atoms will be described in more detail below. However, the scope of the present subject matter is not particularly limited by the following description, which is merely provided to allow for a clearer understanding.

The conductivity of the material having an olivine structure may be improved, at least in part, by doping with nitrogen atoms because the nitrogen atoms may form a nitride and/or an oxynitride when doped into the material having an olivine structure, and the nitride and/or oxynitride may have a high conductivity, may be strong, and may have an excellent thermal stability.

The conductivity of the material having an olivine structure may also be improved, at least in part, by doping with nitrogen atoms because doping nitrogen atoms into the material having an olivine structure may cause an improved alignment regularity of a (020) crystal plane arranged vertically with respect to a diffusion path of a Li ion in the material having an olivine structure. Improved alignment regularity of the (020) crystal plane may be represented as an increased peak strength of the (020) crystal plane in an X-ray diffraction (XRD) spectrum. A diffusion distance of a Li ion may decrease if the alignment regularity of a crystal plane arranged vertically with respect to a diffusion path of a Li ion is improved in comparison to the alignment regularity of, e.g., a crystal plane arranged horizontally with respect to a diffusion path of a Li ion. A decrease in diffusion distance of a Li ion may improve the conductivity of a Li ion.

The material having an olivine structure may be doped with nitrogen atoms, e.g., by contacting the material having an olivine structure with nitrogen precursor gas, e.g., ammonia, at a high temperature for a predetermined time. During the contact between the nitrogen precursor gas and the material having an olivine structure, nitrogen atoms originated from the nitrogen precursor gas may be doped into the material having an olivine structure. The doping may be done to a predetermined doping depth. The doping may be done by diffusion.

If the material having an olivine structure is doped with nitrogen atoms, a concentration of the doped nitrogen atoms in the material may have a concentration gradient. The concentration gradient may decrease in a direction from a surface of the material having an olivine structure towards a center of the material having an olivine structure, such that the concentration of the doped nitrogen atoms may be larger at a surface of the material having an olivine structure than the concentration of the doped nitrogen atoms at a center of the material having an olivine structure. The concentration of the doped nitrogen atoms may increase farther from the center of the material having an olivine structure, and the concentration of the doped nitrogen atoms may decrease closer to the center of the material.

A region doped with nitrogen atoms in the material having an olivine structure may exist in a crystalline phase. The region doped with the nitrogen atoms may have substantially the same crystalline phase as an undoped region of the material having an olivine structure. The region doped with the nitrogen atoms may have the same crystalline phase as an undoped region of the material having an olivine structure, e.g., without forming a separate secondary phase in the material having an olivine structure. The region doped with the nitrogen atoms and the region undoped with the nitrogen atoms may exist as a single phase in the material having an olivine structure. A separate secondary phase may not observed in a high resolution spectrum obtained by using synchrotron X-ray source XRD. For example, in a material having an olivine structure including crystalline $LiFePO_4$, a secondary phase including $Fe^{3+}$ may not be formed in addition to the $LiFePO_4$ crystalline phase.

Doping the material having an olivine structure with nitrogen atoms may not form a separate secondary phase because the doped nitrogen atoms in the material having an olivine structure may substitute for oxygen included in the material having an olivine structure. Therefore, a region doped with the nitrogen atoms and a region undoped with the nitrogen atoms in the material having an olivine structure may be presented as the same phase when observed by a transmission electron microscope (TEM).

A content of a metal with an oxidation number of +3 in the nitrogen-doped material having an olivine structure may be about 5 wt % or less based on the total parts by weight of a metal with an oxidation number of +2 and the metal with an oxidation number of +3 in the nitrogen-doped material having an olivine structure. For example, the content of the metal with an oxidation number of +3 in the nitrogen-doped material having an olivine structure may be in a range of about 0.1 wt % to about 5 wt %, or in a range of about 0.1 wt % to about 2.8 wt %, based on the total parts by weight of a metal with an oxidation number of +2 and the metal with an oxidation number of +3 in the nitrogen-doped material having an olivine structure. The metal with an oxidation number of +3 may be difficult to further oxidize into a metal with an oxidation number of +4 during charging, and the metal with an oxidation number of +3 may not be involved in an electrode reaction. The more the content of the metal with an oxidation number of +3 increases, the more the electric capacity of the composite cathode active material may decrease. The metal with an oxidation number of +3 may be, e.g., $Fe^{+3}$ and the metal with an oxidation number of +2 may be, e.g., $Fe^{+2}$.

In the composite cathode active material, elements other than nitrogen may be doped in the material having an olivine structure. The other doped element is not particularly limited and any element may be used. For example, an element that improves the conductivity of the material having an olivine structure may be used.

The nitrogen-doped material having an olivine structure may exhibit a nitrogen peak having a binding energy range of about 398 eV to about 400 eV, and an oxygen peak having a binding energy range of about 530 eV to about 534 eV in an X-ray photoelectron spectrum. A ratio of the area of a nitrogen peak having a binding energy range of about 398 eV to about 400 eV to an area of an oxygen peak having a binding energy range of about 530 eV to about 534 eV may be about 1:100 or more.

The nitrogen peak may represent a binding energy of a nitrogen 1s orbital in oxide and may represent the existence of a nitride and/or oxynitride in the material having an olivine structure. The nitride and/or oxynitride in the material having an olivine structure may be formed as a result of nitrogen doping. The oxygen peak may represent a binding energy of an oxygen 1s orbital and may represent the existence of oxygen atoms in the material.

The ratio of the nitrogen peak to the oxygen peak may represent a composition ratio of nitrogen to oxygen. The composition ratio of nitrogen to oxygen calculated from each area of the nitrogen peak and the oxygen peak may be about 1:100 or more and may represent that an atomic ratio of nitrogen to oxygen is about 1:100 or more. This may mean that one or more nitrogen atoms per 100 oxygen atoms exist in the material having an olivine structure. The composition ratio of nitrogen to oxygen calculated from the peak areas may be in a range of about 1:100 to about 20:100, or may be in a range of about 1:70 to about 5:60.

The nitrogen-doped material having an olivine structure may exhibit a nitrogen peak having a binding energy range of about 398 eV to about 400 eV, and a phosphorus (P) peak having a binding energy range of about 132 eV to about 136 eV in an X-ray photoelectron spectrum. A ratio of the area of a nitrogen peak having a binding energy range of about 398 eV to about 400 eV to an area of a phosphorus peak having a binding energy range of about 132 eV to about 136 eV may be about 1:100 or more. The phosphorus peak may represent a binding energy of a phosphorus 2p orbital and may represent the existence of phosphorus atoms in the material.

The ratio of the nitrogen peak to the phosphorus peak may represent a composition ratio of nitrogen to phosphorus. The composition ratio of nitrogen to phosphorus calculated from each area of the nitrogen peak and the phosphorus peak may be about 1:100 or more and may represent that an atomic ratio of nitrogen to phosphorus is about 1:100 or more. This may mean that one or more nitrogen atoms per 100 phosphorus atoms exist in the material having an olivine structure. The composition ratio of nitrogen to phosphorus calculated from the peak areas may be in a range of about 1:100 to 30:100, or may be in a range of about 7:100 to 26:100.

The nitrogen-doped material having an olivine structure may exhibit a nitrogen peak having a binding energy range between about 396 eV and about 398 eV. The peak may correspond to a binding energy of a 1s orbital of nitrogen bonded with a transition metal. The transition metal may be, e.g., Fe.

An average doping depth of the nitrogen atoms doped in the material having an olivine structure may be about 50% or less of an average thickness of the material having an olivine structure. The thickness of the material having an olivine structure may be, e.g., a particle diameter. For example, the average doping depth may be about 30% or less, or about 15% or less, of an average thickness of the material having an olivine structure. High C-rate characteristics may be improved by the foregoing average doping depth.

An average particle diameter of the material having an olivine structure may be in a range of about 1 nm to about 1000 μm, e.g., about 10 nm to about 500 μm. The material having an olivine structure may be a particulate powder. If the average particle diameter of the material is about 1 nm or more, capacity may be improved, and if the average particle diameter of the material is about 1000 μm or less, diffusion of lithium may be improved.

A coating layer may be formed on the material having an olivine structure. The material having an olivine structure may have the coating layer thereon, and may be doped as described above, or may be undoped. The coating layer may be disposed on the material having an olivine structure. The conductivity of the material having an olivine structure may be improved by the formation of the coating layer.

In an implementation, the coating layer may include conductive carbon. In an implementation, the coating layer may include the inorganic material including a nitride and/or a carbide of a non-transition metal.

If the coating layer of the material having an olivine structure includes an inorganic material, such as a nitride and/or carbide of a non-transition metal, the non-transition metal may be thermally and chemically stable, and the inorganic material included in the coating layer may function as a dispersant during a preparation process of the composite cathode active material. The electrical conductivity of the composite cathode active material may be improved by an improvement in the dispersibility of the material having an olivine structure.

The inorganic material may include a nitride and/or a carbide of a non-transition metal. The inorganic material, and/or the coating layer, may not include a nitride or carbide of a transition metal. The inorganic material, and/or the coating layer, may not include a nitride, oxynitride, or carbide of a transition metal included in the compound having an olivine structure. For example, the inorganic material, and/or the coating layer, may not include a nitride, oxynitride, or carbide of Fe, Mn, and V. The inorganic material may include a nitride and/or carbide of one or more elements of groups 2 and 13 to 15 of the Periodic Table. The inorganic material may include a nitride and/or carbide of a metalloid element, e.g., boron or silicon. For example, the inorganic material may include one or more of boron nitride (BN), boron carbide ($B_4C$), silicon nitride ($Si_3N_4$), and silicon carbide (SiC), e.g., one of more of a composite of boron nitride and boron carbide, a composite of boron nitride and silicon nitride, and a composite of boron nitride and silicon carbide.

In an embodiment, the inorganic material may include boron. The inorganic material may be, e.g., boron nitride or boron carbide. The inorganic material may include one or more of amorphous boron nitride, boron nitride having a cubic crystal structure, boron nitride having a hexagonal crystal structure, and boron nitride having a wurtzite crystal structure.

The inorganic material may have any suitable form, e.g., one or more forms from the group of a nanoparticle, a nanofiber, a nanomesh, and a nanotube.

In an implementation, the inorganic material may be a nano-size, e.g., the inorganic material may be nanoparticles having an average particle diameter range of about 10 nm to about 500 nm. In an implementation, the size of the inorganic material may be larger than the nano-size, e.g., the inorganic material may be microparticles having an average particle diameter of about 1 μm or more.

A Mohs hardness of the inorganic material may be higher than that of the material having an olivine structure. If the inorganic material has a higher hardness than that of the material having an olivine structure, the material having an olivine structure may be easily dispersed.

The Mohs hardness of the inorganic material may be about 1 or more, e.g., about 1 to about 10. Charge and discharge characteristics of a lithium battery may be improved by including the inorganic material having the foregoing Mohs hardness range. The inorganic material having a Mohs hardness of about 1 or more may be, e.g., boron nitride.

The electrical conductivity of the inorganic material may be lower than that of a general carbon-based material, e.g., amorphous carbon. If the electrical conductivity of the inorganic material is lower than that of the general carbon-based material, e.g., amorphous carbon, the electrical conductivity of the composite cathode active material may improve because the inorganic material may improve the dispersibility of the compound having an olivine structure.

The electrical conductivity of the inorganic material may be, e.g., about $10^{-1}$ S/cm or less, about $10^{-3}$ S/cm or less, or about $10^{-5}$ S/cm to about $10^{-16}$ S/cm. The inorganic material may be, e.g., boron nitride.

A content of inorganic material in the composite cathode active material may be about 20 wt % or less of a total weight of the material having an olivine structure and a coating layer formed thereon. The content of the inorganic material may be, e.g., about 10 wt % or less, in a range of about 0.01 wt % to about 10 wt %, in a range of about 0.1 wt % to about 10 wt %, or in a range of about 0.5 wt % to about 10 wt %, based on the total weight of the material having an olivine structure and a coating layer formed thereon.

A composite cathode active material as described above may be included in a cathode. The composite cathode active material may be included in a cathode as part of a cathode active material composition.

A cathode active material composition may be prepared by mixing a composite cathode active material, a conductive agent, a binder, and a solvent. A cathode plate with a cathode active layer formed thereon may be prepared by directly coating and drying the cathode active material composition on an aluminum current collector. The cathode active material composition may also be cast on a separate support to form a film, and then a cathode plate with a cathode active layer formed thereon may be prepared by detaching the film from the support and laminating the detached film on an aluminum current collector.

The conductive agent may be any suitable conductive agent, e.g., one or more of carbon black, graphite fine particles, natural graphite, artificial graphite, acetylene black, Ketjen black, carbon fibers, carbon nanotubes, metal powders, metal fibers, metal tubes, and conductive polymers, where the metal may be, e.g., copper, nickel, aluminium, or silver, and the conductive polymers may be, e.g., a polyphenylene derivative.

The binder may be any suitable binder, e.g., one or more of vinylidene fluoride/hexafluoropropylene copolymer, polyvinylidene fluoride, polyacrylonitrile, poly(methyl methacrylate), polytetrafluoroethylene (PTFE), and styrene butadiene rubber-based polymer. The solvent may be any suitable solvent, e.g., one or more of N-methylpyrrolidone (NMP), acetone, and water.

Pores in the electrode plate may be formed by adding a plasticizer to the cathode active material composition.

The amounts of the composite cathode active material, conductive agent, binder, and solvent in the cathode active material composition may be any suitable amount. One or more of the conductive agent, binder, and solvent may be omitted.

The cathode may include one or more additional cathode active materials in addition to the composite cathode active material.

The additional cathode active material may include, e.g., a lithium-containing metal oxide. The additional cathode active material may include, e.g., one or more composite oxide of one or more metal and lithium, where the metal may be one or more of cobalt, manganese and nickel. As examples of the additional cathode active material, a compound represented by one of the following chemical formulas may be used: $Li_aA_{1-b}B_bD_2$ (where $0.90 \leq a \leq 1$, $0 \leq b \leq 0.5$); $Li_aE_{1-b}B_bO_{2-c}D_c$ (where $0.90 \leq a \leq 1$, $0 \leq b \leq 0.5$, $0 \leq c \leq 0.05$); $LiE_{2-b}B_bO_{4-c}D_c$ (where $0 \leq b \leq 0.5$, $0 \leq c \leq 0.05$); $Li_aNi_{1-b-c}Co_bB_cD_\alpha$ (where $0.90 \leq a \leq 1$, $0 \leq b \leq 0.5$, $0 \leq c \leq 0.05$, $0 < \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, $0 < \alpha < 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, $0 < \alpha < 2$); $Li_aNi_{1-b-c}Mn_bB_cD_\alpha$ (where $0.90 \leq a \leq 1$, $0 \leq b \leq 0.5$, $0 \leq c \leq 0.05$, $0 < \alpha < 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, $0 < \alpha < 2$); $Li_aNi_{1-b-c}Mn_bB_cO_{2-\alpha}F_2$ (where $0.90 \leq a \leq 1$, $0 \leq b \leq 0.5$, $0 \leq c \leq 0.05$, $0 < \alpha < 2$); $Li_aNi_bE_cG_dO_2$ (where $0.90 \leq a \leq 1$, $0 \leq b \leq 0.9$, $0 \leq c \leq 0.5$, $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1$, $0.001 \leq b \leq 0.1$); $Li_aCoG_bO_2$ (where $0.90 \leq a \leq 1$, $0.001 \leq b \leq 0.1$); $Li_aMnG_bO_2$ (where $0.90 \leq a \leq 1$, $0.001 \leq b \leq 0.1$); $Li_aMnG_bO_4$ (where $0.90 \leq a \leq 1$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; J is V, Cr, Mn, Co, Ni, Cu, or a combination thereof.

Specific, non-limiting examples of the additional cathode active material may be $LiCoO_2$, $LiMn_xO_{2x}$ ($x = 1, 2$), $LiNi_{1-x}Mn_xO_2$ ($0 < x < 1$), $LiNi_{1-x-y}Co_xMn_yO_2$ ($0 \leq x \leq 0.5$, $0 \leq y \leq 0.5$), and $LiFePO_4$.

The additional cathode active material may have a coating layer, or the additional cathode active material may include a mixture of an uncoated additional cathode active material and a coated additional cathode active material. The coating layer may include as a coating compound an oxide, hydroxide, oxyhydroxide, oxycarbonate, or hydroxycarbonate of a coating element. The coating compound may be amorphous or crystalline. The coating element may include one or more of Mg, Al, Co, K, Na, Ca, Si, Ti, V, Sn, Ge, Ga, B, As, and Zr. As the method of forming the coating layer, the process is not particularly limited and any process of forming a coating layer may be performed, e.g., spray coating, or dipping. If the foregoing coating compounds are used in a coating layer, the coating layer may not adversely affect the physical properties of the additional cathode active material.

A lithium battery may include a cathode that includes the composite cathode active material. The lithium battery may be prepared according to the following method.

First, as discussed above, a cathode may be prepared that includes the composite cathode active material.

Next, an anode may be prepared in a similar manner as the cathode. The anode may be prepared in the same manner as the cathode, except that the anode may include an anode active material instead of the composite cathode active material. The anode may include an anode active material composition that includes the anode active material.

The anode active material composition may be prepared by mixing an anode active material, a conductive agent, a binder, and a solvent. An anode plate may be prepared by directly coating the anode active material composition on a copper current collector. An anode plate may also be prepared by casting the anode active material composition on a separate support to form a film, and then detaching the film from the separate support and laminating the detached film to a copper current collector.

The anode active material is not particularly limited and may include any anode active material. The anode active material may be an anode active material for a lithium battery. The anode active material may include, e.g., one or more of a lithium metal, a metal alloyable with lithium, a transition metal oxide, a non-transition metal oxide, and a carbon-based material.

The metal alloyable with lithium may include, e.g., one or more of Si, Sn, Al, Ge, Pb, Bi, Sb, a Si—Y alloy (where Y is not Si and is one or more of an alkaline metal, an alkaline earth metal, a group 13 element, a group 14 element, a transition metal, and a rare earth element), and a Sn—Y alloy (where Y is not Sn and is one or more of an alkaline metal, a alkaline earth metal, a group 13 element, a group 14 element, a transition metal, and a rare earth element). Specific, non-limiting examples of Y may be one or more of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

The transition metal oxide may include, e.g., one or more of lithium titanate, vanadium oxide, and lithium vanadium oxide.

The non-transition metal oxide may include, e.g., one or more of $SnO_2$ and $SiO_x$ ($0<x<2$).

The carbon-based material may include one or more of crystalline carbon and amorphous carbon. The crystalline carbon may include one or more graphites, such as, e.g., shapeless, plate, flake, spherical, or fibrous graphite, where the graphite may be natural or artificial graphite. The amorphous carbon may include one or more of soft carbon (e.g., low-temperature fired carbon), hard carbon, mesophase pitch carbide, and fired coke.

The amounts of the anode active material, conductive agent, binder, and solvent in the anode active material composition are not limited. One or more of the conductive agent, binder, and solvent may be omitted.

Next, a separator may be prepared. The separator may be inserted between the cathode and the anode. The separator is not particularly limited and any separator may be used. A separator having high moisture-retention ability for an electrolyte and/or a low resistance to the transfer of electrolyte ions may be used. The separator may include, e.g., one or more of glass fibers, polyester, Teflon, polyethylene, polypropylene, and polytetrafluoroethylene (PTFE). The separator may be a nonwoven or woven fabric type. A windable separator such as, e.g., polyethylene or polypropylene may be used in a lithium-ion battery. A separator having high moisture-retention ability for an organic electrolyte may be used in a lithium-ion polymer battery.

A separator may be prepared by mixing a polymer resin, a filler, and a solvent to form a separator composition. An upper portion of an electrode may be directly coated with the separator composition and dried to prepare a separator. An upper portion of an electrode may be prepared by casting the separator composition on a separate support to form a film, and then detaching the film from the separate support, and laminating the detached film on an upper portion of an electrode.

The polymer resin used in the separator composition is not particularly limited. The polymer resin may include, e.g., one or more of vinylidene fluoride/hexafluoropropylene copolymer, PVDF, polyacrylonitrile, and poly(methyl methacrylate).

Next, an electrolyte may be prepared. The electrolyte is not particularly limited, and the electrolyte may be an organic electrolyte and/or a solid. A solid electrolyte may include, e.g., one or more of boron oxide and lithium oxynitride. A solid electrolyte may be formed on the anode by, e.g., sputtering.

An organic electrolyte may be prepared by dissolving a lithium salt in an organic solvent. The organic solvent is not particularly limited. Examples of an organic solvent may include, e.g., one or more of propylene carbonate, ethylene carbonate, fluoroethylene carbonate, butylene carbonate, dimethyl carbonate, diethyl carbonate, methylethyl carbonate, methylpropyl carbonate, ethyipropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, and dimethylether.

The lithium salt is not particularly limited. The lithium salt may include, e.g., one or more of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, and LiI.

Figure 4:
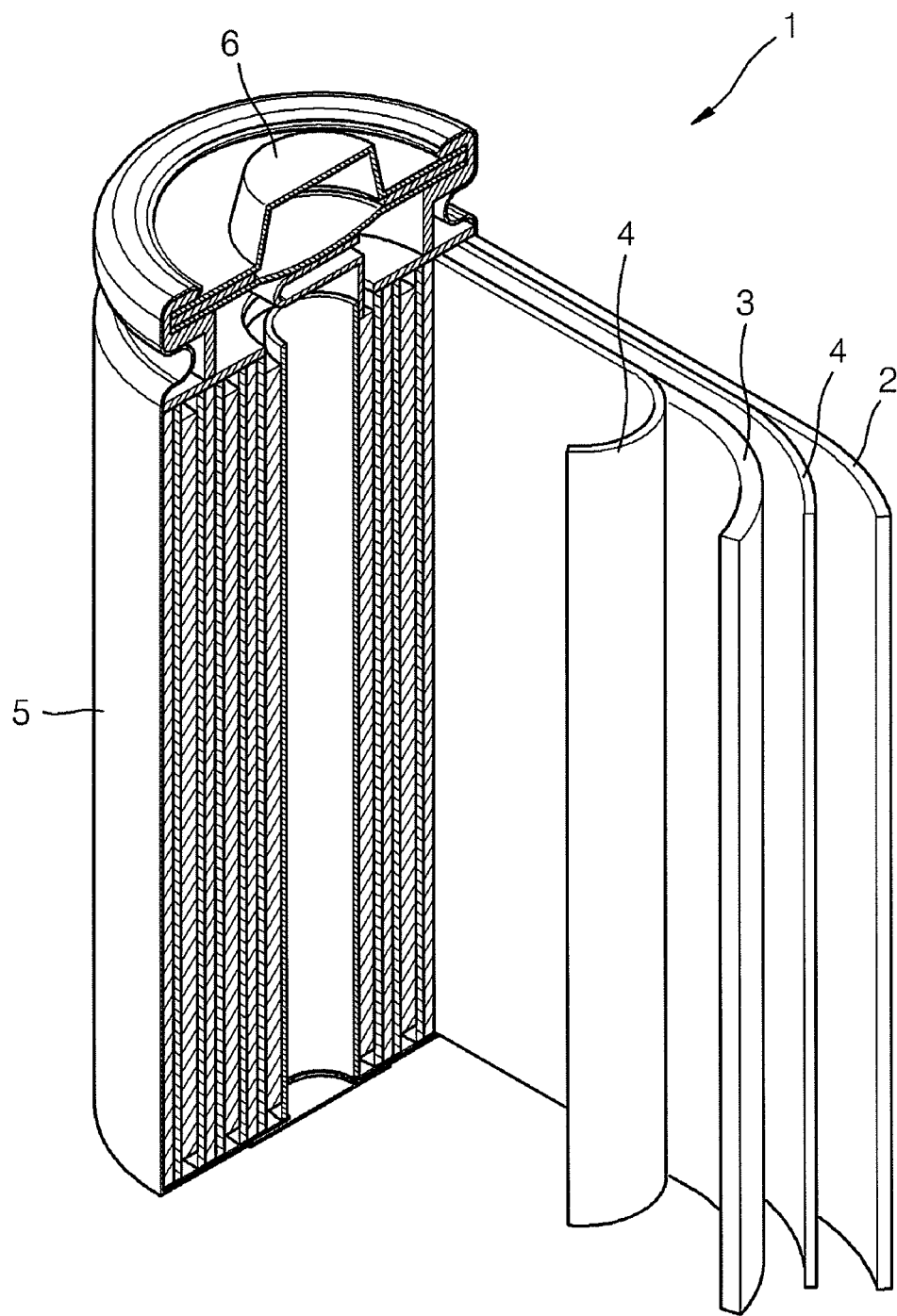
FIG. 4 illustrates a schematic view of a lithium battery according to an embodiment.

As shown in FIG. 4, a lithium battery 1 may include a cathode 3, an anode 2, and a separator 4. The cathode 3, anode 2, and separator 4 may be wound and folded to be contained in a battery case 5. An organic electrolyte solution may be injected into the battery case 5, and the lithium battery 1 may be sealed with a cap assembly 6. The battery case 5 may be a cylindrical, rectangular, or thin-film type battery case. The lithium battery 1 may be, e.g., a large thin-film type battery. The lithium battery 1 may be a lithium-ion battery. The particular lithium battery illustrated in FIG. 4 only represents one or more embodiment of the present lithium battery, and the scope of the present lithium battery is not limited to the particular configuration illustrated in FIG. 4.

The separator 4 may be disposed between the cathode 3 and the anode 2 such that a battery structure may be formed. The battery structure may be stacked in a bi-cell structure, and then impregnated with the organic electrolyte solution. A lithium-ion polymer battery may be contained in a pouch and sealed.

The battery structures may be stacked to form a battery pack, and the battery pack may be used in, e.g., any device demanding high capacity and high power. For example, the battery pack may be used in a notebook, a smartphone, or an electric vehicle (EV).

The lithium battery may be used in an EV because it may have an excellent high C-rate and life characteristics. For example, the lithium battery may be used in a hybrid vehicle such as a plug-in hybrid electric vehicle (PHEV). The lithium battery may also be used in any device that includes a large amount of power storage. The lithium battery may be used in, e.g., an electric bicycle or an electric power tool.

A method of preparing a composite cathode active material may include mixing the overlithiated metal oxide having a layered structure and the material having an olivine structure. The material having an olivine structure may be doped with nitrogen atoms, or the material having an olivine structure may have a coating layer formed thereon, where the coating layer includes the inorganic material that includes a nitride or carbide of a non-transition metal. The material having an olivine structure may be doped with nitrogen atoms and may include the inorganic material. The material having an olivine structure may include a mixture of materials having an olivine structure, where one of the materials having an olivine structure is doped with nitrogen atoms and the other material having an olivine structure includes the inorganic material.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

(Preparation of Material Having an Olivine Structure)

Preparation Example 1

300 mg of LiFePO$_4$ (Phostech Lithium Inc.) having an average particle diameter of about 200 nm and a carbon-coating layer formed on a surface thereof was put into a silica tube furnace at room temperature and pressure inside the furnace was made into a vacuum state. Subsequently, the furnace in a vacuum state was heated from room temperature to about 300° C. for about 10 minutes and ammonia gas (99.98%) was then supplied at a flow rate of about 500 standard cubic centimeters per minutes (sccm) for about 10 minutes while the inside of the furnace was maintained at a temperature of about 300° C. and a pressure of about 760 Torn Thereafter, the flow rate was decreased and ammonia gas was supplied at a flow rate of about 100 sccm for about 20 minutes to perform nitrogen doping for a total of about 30 minutes. The nitrogen doping was terminated by stopping the flow of ammonia gas and then the pressure inside the furnace was again made into a vacuum state. Nitrogen-doped LiFePO$_4$ was obtained by cooling to room temperature.

Preparation Example 2

Li$_2$CO$_3$, MnCO$_3$, FeC$_2$O$_4$, and NH$_4$H$_2$PO$_4$ were mixed at a mole ratio of about 0.5:0.9:0.1:1.0 and then carbon powder (Ketjen Black 600JD) and boron nitride (BN) were added thereto to form a mixture. The mixture was sintered at about 600° C. for about 6 hours in an inert atmosphere (nitrogen atmosphere) to prepare a material having an olivine structure with a coating layer that includes boron nitride. The material having an olivine structure was LiMn$_{0.9}$Fe$_{0.1}$PO$_4$.

An amount of carbon powder (Ketjen Black 600JD) and boron nitride (BN) added was about 4.8 wt % of carbon powder (Ketjen Black 600JD) and about 0.2 wt % of boron nitride (BN) respectively based on a total weight of the sintered resulting material having an olivine structure and a coating layer, including boron nitride, formed thereon.

Comparative Preparation Example 1

LiFePO$_4$ (Phostech Lithium Inc.) having an average particle diameter of about 200 nm and a carbon-coating layer formed thereon was obtained.

(Preparation of Composite Cathode Active Material)

Example 1

A composite cathode active material was prepared by mixing about 20 wt % of overlithiated metal oxide Li$_{1.04}$Ni$_{0.45}$Co$_{0.16}$Mn$_{0.35}$O$_2$ and about 80 wt % of the nitrogen-doped material having an olivine structure prepared in Preparation Example 1. The mixing was performed at about 150 rpm for about 30 minutes by using a ball mill and subsequently performed by using a mortar.

Example 2

A composite cathode active material was prepared by mixing about 40 wt % of overlithiated metal oxide Li$_{1.04}$Ni$_{0.45}$Co$_{0.16}$Mn$_{0.35}$O$_2$ and about 60 wt % of the nitrogen-doped material having an olivine structure prepared in Preparation Example 1. The mixing was performed in the same manner as Example 1.

Example 3

A composite cathode active material was prepared by mixing about 60 wt % of overlithiated metal oxide Li$_{1.04}$Ni$_{0.45}$Co$_{0.16}$Mn$_{0.35}$O$_2$ and about 40 wt % of the nitrogen-doped material having an olivine structure prepared in Preparation Example 1. The mixing was performed in the same manner as Example 1.

Example 4

A composite cathode active material was prepared by mixing about 80 wt % of overlithiated metal oxide Li$_{1.04}$Ni$_{0.45}$Co$_{0.16}$Mn$_{0.35}$O$_2$ and about 20 wt % of the nitrogen-doped material having an olivine structure prepared in Preparation Example 1. The mixing was performed in the same manner as Example 1.

Example 5

A composite cathode active material was prepared by mixing about 20 wt % of overlithiated metal oxide Li$_{1.04}$Ni$_{0.45}$Co$_{0.16}$Mn$_{0.35}$O$_2$ and about 80 wt of the material having an olivine structure and a coating layer including an inorganic material formed thereon prepared in Preparation Example 2. The mixing was performed in the same manner as Example 1.

Example 6

A composite cathode active material was prepared by mixing about 40 wt % of overlithiated metal oxide Li$_{1.04}$Ni$_{0.45}$Co$_{0.16}$Mn$_{0.35}$O$_2$ and about 60 wt % of the material having an olivine structure and a coating layer including an inorganic material formed thereon prepared in Preparation Example 2. The mixing was performed in the same manner as Example 1.

Example 7

A composite cathode active material was prepared by mixing about 60 wt % of overlithiated metal oxide Li$_{1.04}$Ni$_{0.45}$Co$_{0.16}$Mn$_{0.35}$O$_2$ and about 40 wt % of the material having an olivine structure and a coating layer including an inorganic material formed thereon prepared in Preparation Example 2. The mixing was performed in the same manner as Example 1.

Example 8

A composite cathode active material was prepared by mixing about 80 wt % of overlithiated metal oxide Li$_{1.04}$Ni$_{0.45}$Co$_{0.16}$Mn$_{0.35}$O$_2$ and about 20 wt % of the material having an olivine structure and a coating layer including an inorganic material formed thereon prepared in Preparation Example 2. The mixing was performed in the same manner as Example 1.

Comparative Example 1

About 100 wt % of overlithiated metal oxide Li$_{1.04}$Ni$_{0.45}$Co$_{0.16}$Mn$_{0.35}$O$_2$ was used as a cathode active material.

Comparative Example 2

About 100 wt % of the nitrogen-doped material having an olivine structure prepared in Preparation Example 1 was used as a cathode active material.

Comparative Example 3

About 100 wt % of the material having an olivine structure and a coating layer including an inorganic material formed thereon prepared in Preparation Example 2 was used as a cathode active material.

Comparative Example 4

A composite cathode active material was prepared by mixing about 20 wt % of overlithiated metal oxide $Li_{1.04}Ni_{0.45}Co_{0.16}Mn_{0.35}O_2$ and about 80 wt % of $LiFePO_4$ (Phostech Lithium Inc.) having an average particle diameter of about 200 nm and a carbon-coating layer formed thereon. The material having an olivine structure was undoped with nitrogen atoms. The mixing was performed in the same manner as Example 1.

Comparative Example 5

A composite cathode active material was prepared by mixing about 40 wt % of overlithiated metal oxide $Li_{1.04}Ni_{0.45}Co_{0.16}Mn_{0.35}O_2$ and about 60 wt % of $LiFePO_4$ (Phostech Lithium Inc.) having an average particle diameter of about 200 nm and a carbon-coating layer formed thereon. The material having an olivine structure was undoped with nitrogen atoms. The mixing was performed in the same manner as Example 1.

Comparative Example 6

A composite cathode active material was prepared by mixing about 60 wt % of overlithiated metal oxide $Li_{1.04}Ni_{0.45}Co_{0.16}Mn_{0.35}O_2$ and about 40 wt % of $LiFePO_4$ (Phostech Lithium Inc.) having an average particle diameter of about 200 nm and a carbon-coating layer formed thereon. The material having an olivine structure was undoped with nitrogen atoms. The mixing was performed in the same manner as Example 1.

Comparative Example 7

A composite cathode active material was prepared by mixing about 80 wt % of overlithiated metal oxide $Li_{1.04}Ni_{0.45}Co_{0.16}Mn_{0.35}O_2$ and about 20 wt % of $LiFePO_4$ (Phostech Lithium Inc.) having an average particle diameter of about 200 nm and a carbon-coating layer formed thereon. The material having an olivine structure was undoped with nitrogen atoms. The mixing was performed in the same manner as Example 1.

(Preparation of Cathode and Lithium Battery)

Example 9

The composite cathode active material powder prepared in Example 1 and a carbon conductive agent (Super-P, Timcal Ltd.) were uniformly mixed at a weight ratio of about 90:5. A polyvinylidene fluoride (PVDF) binder solution was then added to prepare slurry with a weight ratio of active material:carbon conductive agent:binder of about 90:5:5.

About 15 μm thick aluminium foil was coated with the active material slurry and then dried to prepare a cathode plate. A coin cell (CR2016 type) having a diameter of about 12 mm was prepared by further performing vacuum drying.

Metallic lithium was used as a counter electrode during the preparation of the coin cell, a polypropylene separator (Celgard 3501) was used as a separator, and an electrolyte used was prepared by dissolving about 1.3 M $LiPF_6$ in a solvent mixture of ethylene carbonate (EC):diethyl carbonate (DEC) (a volume ratio of about 3:7).

Examples 10 to 16

A lithium battery was prepared in the same manner as Example 9 except that the composite cathode active materials synthesized in Examples 2 to 8 were used, respectively.

Comparative Examples 8 to 14

A lithium battery was prepared in the same manner as Example 9 except that the cathode active materials synthesized in Comparative Examples 1 to 7 were used, respectively.

Evaluation Example 1: X-ray Diffraction (XRD) Experiment

XRD experiments were performed on the materials having an olivine structure prepared in Preparation Example 1 and Comparative Preparation Example 1. XRD was measured by using a synchrotron high resolution X-ray source at Pohang Accelerator Laboratory. According to the results of the measurements, a separate peak with respect to a new secondary phase was not observed despite the nitrogen doping in Preparation Example 1. That is, a new peak was not observed. Also, a relative strength of a peak corresponding to a (020) crystal plane in the material of Preparation Example 1 was increased as compared to that of the material of Comparative Preparation Example 1. This may represent an improved alignment regularity of the (020) crystal plane arranged vertically with respect to a diffusion path of a Li ion in the material having an olivine structure.

Evaluation Example 2: X-ray Photoelectron Spectroscopy (XPS) Experiment

XPS experiments were performed on the materials having an olivine structure prepared in Preparation Example 1 and Comparative Preparation Example 1. An instrument used in the XPS experiments was a Q2000 model of Physical Electronics (PHI), Inc., and a mono Al K (1486.6 eV) X-ray source was used.

The nitrogen-doped material having an olivine structure of Preparation Example 1 exhibited a peak corresponding to a binding energy of the nitrogen 1s orbital near 399 eV. Therefore, the existence of nitrogen was confirmed on a surface of the coating layer.

Also, relative compositions of elements calculated from peak areas corresponding to the respective elements in the XPS experiments are presented in Table 1 below.

TABLE 1

|  | N(1s) ~399 eV | N(1s) 396.4 eV | O(1s) 530~534 eV | P(2p) 132~136 eV | Fe(2p3) 705~720 eV |
|---|---|---|---|---|---|
| Preparation Example 1 | 1.43 | — | 69.69 | 16.46 | 12.68 |
| Comparative Preparation Example 1 | — | — | 70.11 | 17.32 | 12.56 |

As shown in Table 1, a composition ratio of nitrogen to oxygen calculated from an area of a nitrogen peak at about 399 eV and an area of an oxygen peak from about 530 eV to about 534 eV existing near a surface of the material was within a range of about 1:70 to about 5:60. Also, a composition ratio of nitrogen to phosphorus (P) calculated from an area of a nitrogen peak at about 399 eV and an area of a phosphorus peak from about 132 eV to about 136 eV was within a range of about 7:100 to about 26:100. A nitrogen peak was not observed in Comparative Preparation Example 1.

Therefore, it may be understood that the nitrogen-doped material had an olivine structure is a single phase, without having a separate secondary phase.

Evaluation Example 3: Mossbauer Experiment

Mossbauer experiments were performed on the cathode active material powders prepared in Preparation Example 1 and Comparative Preparation Example 1 at room temperature and the results thereof are presented in Table 2. A $^{57}$Co source included in an Rh matrix was used in order to measure Mossbauer spectroscopy. The measured values were calibrated by using a standard α-Fe foil as a reference.

TABLE 2

|  | Oxidation number | IS [mm/s] | QS [mm/s] | Γ (half-value width) | Wt % |
|---|---|---|---|---|---|
| Comparative Preparation Example 1 | $Fe^{2+}$ | 1.108 | 2.954 | 0.251 | 97.11 |
|  | $Fe^{3+}$ | 0.382 | 0.506 | 0.377 | 2.89 |
| Preparation Example 1 | $Fe^{2+}$ | 1.108 | 2.954 | 0.249 | 97.74 |
|  | $Fe^{3+}$ | 0.370 | 0.590 | 0.278 | 2.26 |

As shown in Table 2, the materials having an olivine structure of Preparation Example 1 and Comparative Preparation Example 1 had $Fe^{3+}$ contents of about 5 wt % or less, and the $Fe^{3+}$ content of Preparation Example 1 was smaller than that of Comparative Preparation Example 1. The half-value width is a value of full width at half maximum (FWHM) with respect to a peak shown in a Mossbauer spectrum.

Evaluation Example 4: Transmission Electron Microscopy (TEM) Experiment

TEM experiments were performed on the cathode active material powders prepared in Preparation Example 1 and Comparative Preparation Example 1.

The $LiFePO_4$ of Comparative Preparation Example 1 showed the same crystal phase as that of the nitrogen-doped $LiFePO_4$ of Preparation Example 1. That is, the crystal structure of $LiFePO_4$ was not changed despite of the nitrogen doping in Preparation Example 1 and a separate amorphous phase was also not formed.

Evaluation Example 5: Calorific Value Measurement Experiment

The coin cells prepared in Examples 9 to 16 and Comparative Example 8 were charged and discharged once at a constant current of about 8.5 mA/g (0.05 C rate) in a voltage range of about 3 V to about 4.5 V with respect to lithium metal at about 25° C., and were charged and discharged twice at a constant current of about 17 mA/g (0.1 C rate) in a voltage range of about 3 V to about 4.5 V with respect to lithium metal. Subsequently, the coin cells were charged once at a constant current of about 17 mA/g (0.1 C rate) to a voltage of about 4.5 V with respect to lithium metal at about 25° C.

The charged coin cells were disassembled, and then the cathode active materials were extracted and dynamic scanning calorimeter (DSC) analyses were performed thereon.

A portion of the results of the DSC analyses are presented in Table 3 and FIG. 1. Calorific values in Table 3 were calculated by integrating an exothermic curve.

TABLE 3

|  | Calorific value [J/g] |
|---|---|
| Comparative Example 8 | 1013 |
| Example 12 | 918.5 |
| Example 11 | 650.2 |
| Example 10 | 515.4 |
| Example 9 | 452.7 |

As shown in Table 3 and FIG. 1, calorific values of the lithium batteries including the composite cathode active materials of Examples 9 to 12 decreased in comparison to that of the lithium battery including only the overlithiated metal oxide (OLO) of Comparative Example 8, and thus, the thermal stabilities thereof were improved.

In particular, the calorific values of the lithium batteries of Examples 9 to 11 having overlithiated metal oxide contents of less than about 80 wt % significantly decreased.

Evaluation Example 6: High C-Rate Charge-Discharge Experiment (1)

Figure 2:
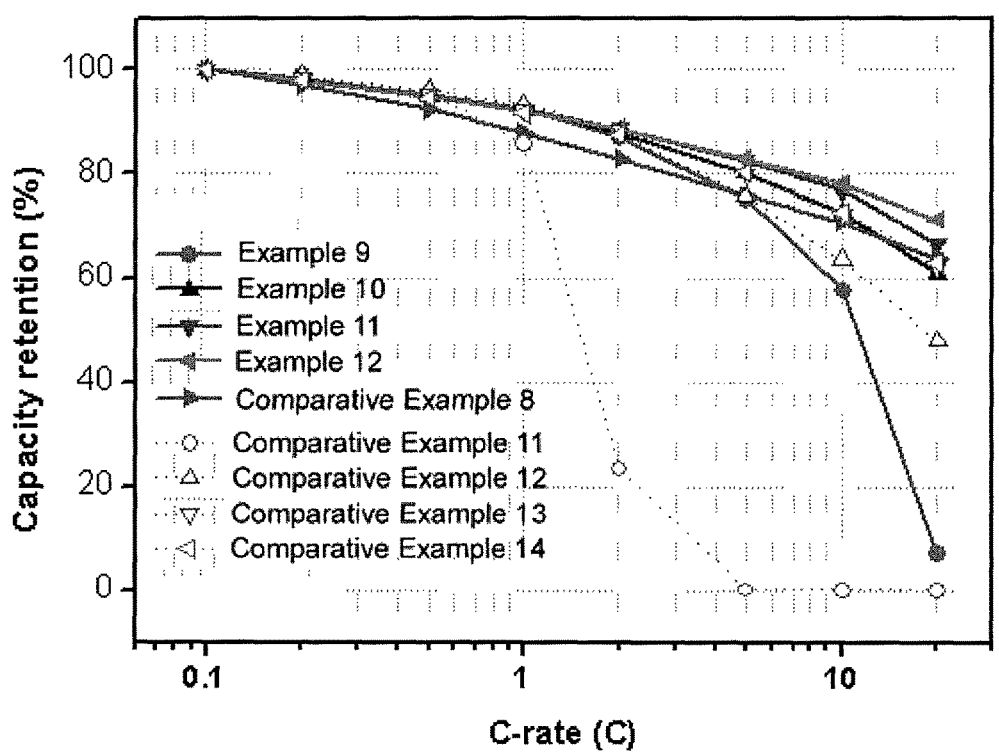
FIG. 2 illustrates the results of high C-rate characteristic experiments on lithium batteries prepared in Examples 9 to 12 and Comparative Examples 8 and 11 to 14.

Portions of discharge capacities are presented in FIG. 2 according to an increase in current density during discharging while the coin cells prepared in Examples 9 to 12 and Comparative Examples 8, and 11 to 14 were charged at a 0.1 C constant current rate in a voltage range of about 2.5 V to about 4.1 V with respect to lithium metal at room temperature (25° C.). The Y-axis of FIG. 2 represents a capacity retention ratio corresponding to a ratio of the discharge capacity at the C-rate shown on the X-axis, to the discharge capacity at 0.1 C. Current densities during discharging were 0.1 C, 0.2 C, 0.5 C, 1 C, 2 C, 5 C, 10 C, and 20 C rates, respectively.

As shown in FIG. 2, high C-rate characteristics of the lithium batteries of Examples 9 to 12 were overall improved in comparison to those of the lithium batteries of Comparative Examples 11 to 14.

In particular, the high C-rate characteristics of the lithium battery of Example 12 were improved in comparison to that of the lithium battery of Comparative Example 8 which included only the overlithiated metal oxide.

Evaluation Example 7: High C-Rate Charge-Discharge Experiment (2)

Figure 3:
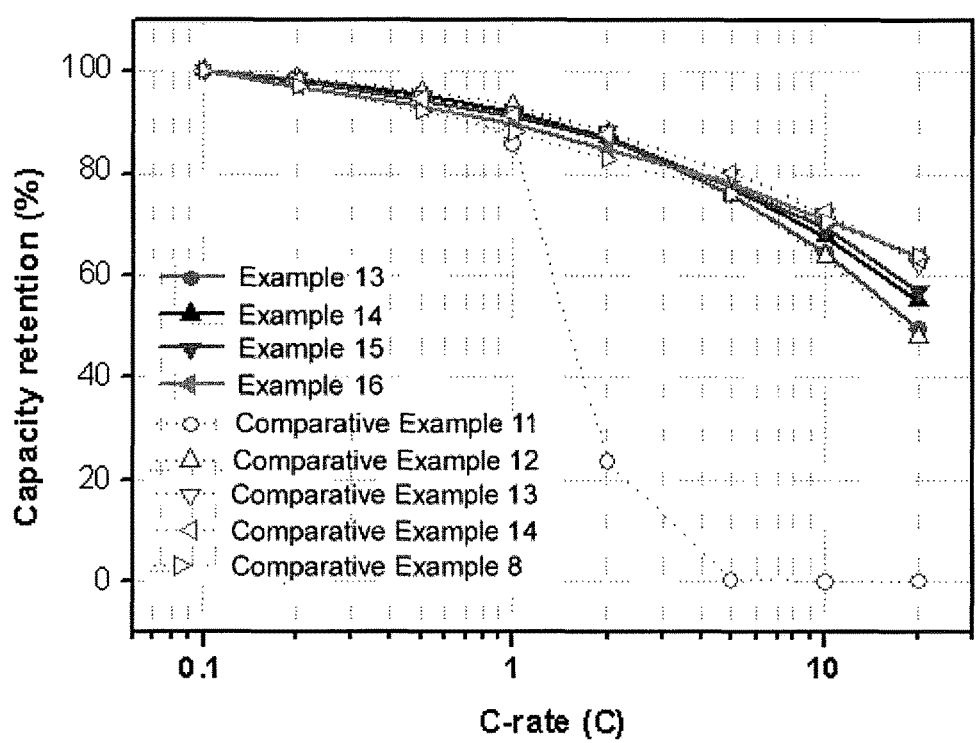
FIG. 3 illustrates the results of high C-rate characteristic experiments on lithium batteries prepared in Examples 13 to 16 and Comparative Examples 8 and 11 to 14.

Portions of discharge capacities are presented in FIG. 3 according to an increase in current density during discharging while the coin cells prepared in Examples 13 to 16 and Comparative Examples 8 and 11 to 14 were charged at a 0.1 C constant current rate in a voltage range of about 2.5 V to about 4.1 V with respect to lithium metal at room temperature (25° C.). The Y-axis of FIG. 3 represents a capacity retention ratio corresponding to a ratio of the discharge capacity at the C-rate shown on the X-axis, to the discharge capacity at 0.1 C. Current densities during discharging were 0.1 C, 0.2 C, 0.5 C, 1 C, 2 C, 5 C, 10 C, and 20 C rates, respectively.

As shown in FIG. 3, high C-rate characteristics of the lithium batteries of Examples 13 to 16 were overall improved in comparison to those of the lithium batteries of Comparative Examples 11 to 14.

By way of summation and review, overlithiated metal oxides may provide increased electric capacity. However, the overlithiated metal oxide may have a poor thermal stability. Olivine-based lithium metal oxide may have excellent thermal stability, may be structurally stable, may have no side reaction such as oxygen generation, and may be relatively cheap. However, the olivine-based lithium metal oxide may have a low electrical conductivity and low energy capacity.

According to an embodiment, thermal stability and high C-rate characteristics of a lithium battery may be improved by including an embodiment of the composite cathode active material.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A composite cathode active material, comprising:
an overlithiated metal oxide represented by Chemical Formula 1; and
a material having an olivine structure;
wherein the material having an olivine structure includes a coating layer including an inorganic material formed thereon, or the material having an olivine structure is doped with an inorganic material,
wherein the inorganic material includes a nitride or carbide of a non-transition metal,

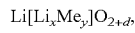
Li[Li$_x$Me$_y$]O$_{2+d}$, <Chemical Formula 1> where x+y=1, 0<x<1, 0≤d≤0.1, and Me is one or more selected from the group of Mn, V, Cr, Fe, Co, Ni, Zr, Re, Al, B, Ge, Ru, Sn, Ti, Nb, Mo, and Pt,
wherein the overlithiated metal oxide is a solid solution of LiMe'O$_3$ and LiMe"O$_2$,
Me' is one or more selected from the group of Mn, Zr and Ti, and
Me" is one or more selected from the group of Ni, Co, Mn, Cr, Fe, V, Al, Mg and Ti.

2. The composite cathode active material as claimed in claim 1, wherein a content of the overlithiated metal oxide is in a range of about 5 wt % to about 95 wt % of a total weight of the composite cathode active material.

3. The composite cathode active material as claimed in claim 2, wherein the content of the overlithiated metal oxide is in a range of about 40 wt % to about 60 wt % of the total weight of the composite cathode active material.

4. The composite cathode active material as claimed in claim 1, wherein the overlithiated metal oxide is represented by Chemical Formula 2:

Li[Li$_x$Ni$_a$Co$_b$Mn$_c$]O$_{2+d}$, <Chemical Formula 2> where x+a+b+c=1, 0<x<1, 0 a<1, 0<b<1, 0<c<1, and 0≤d≤0.1.

5. The composite cathode active material as claimed in claim 1, wherein the material having an olivine structure includes a lithium metal oxide represented by Chemical Formula 3:

Li$_x$M$_y$M'$_z$PO$_{4-d}$X$_d$, <Chemical Formula 3> where 0.9≤x≤1.1, 0≤y≤1, 0≤z≤1, 1.9≤x+y+z≤2.1, 0≤d≤0.2, M is one or more of Fe, Mn, Ni, and Co, M' is one or more of Mg, Ca, Sr, Ba, Ti, Zr, Nb, Mo, W, Zn, Al, and Si, and X is one or more of S and F.

6. The composite cathode active material as claimed in claim 1, wherein the material having an olivine structure includes one or more of LiFePO$_4$, LiFe$_{1-a}$Mn$_a$PO$_4$ (0<a<1), and LiMnPO$_4$.

7. The composite cathode active material as claimed in claim 1, wherein the material having an olivine structure includes a metal with an oxidation number of +2 and a metal with an oxidation number of +3, and a content of the metal with an oxidation number of +3 in the material having an olivine structure is about 5 wt % or less of a total content of the metal with an oxidation number of +2 and the metal with an oxidation number of +3 in the material having an olivine structure.

8. The composite cathode active material as claimed in claim 1, wherein the material having an olivine structure exhibits a nitrogen peak having a binding energy range of about 398 eV to about 400 eV and an oxygen peak having a binding energy range of about 530 eV to about 534 eV in an X-ray photoelectron spectrum, and a ratio of an area of the nitrogen peak to an area of the oxygen peak is about 1:100 or more.

9. The composite cathode active material as claimed in claim 8, wherein the ratio of the area of the nitrogen peak to the area of the oxygen peak is about 1:100 to about 20:100.

10. The composite cathode active material as claimed in claim 1, wherein the material having an olivine structure exhibits a nitrogen peak having a binding energy range of about 398 eV to about 400 eV and a phosphorus peak having a binding energy range of about 132 eV to about 136 eV in an X-ray photoelectron spectrum, and a ratio of an area of the nitrogen peak to an area of the phosphorus peak is about 1:100 or more.

11. The composite cathode active material as claimed in claim 10, wherein the ratio of the area of the nitrogen peak to the area of the phosphorus peak is about 1:100 to about 30:100.

12. The composite cathode active material as claimed in claim 1, wherein the material having an olivine structure exhibits a nitrogen peak having a binding energy range of about 396 eV to about 398 eV.

13. The composite cathode active material as claimed in claim 1, further comprising a coating layer including conductive carbon formed on the material having an olivine structure.

14. The composite cathode active material as claimed in claim 1, wherein the inorganic material is one or more of boron nitride (BN) and boron carbide ($B_4C$).

15. The composite cathode active material as claimed in claim 1, wherein the inorganic material includes one or more of amorphous boron nitride, boron nitride having a cubic crystal structure, boron nitride having a hexagonal crystal structure, and boron nitride having a wurtzite crystal structure.

16. The composite cathode active material as claimed in claim 1, wherein the inorganic material has one or more forms of a nanoparticle, a nanofiber, a nanomesh, and a nanotube.

17. The composite cathode active material as claimed in claim 1, wherein the inorganic material has a Mohs hardness higher than a Mohs hardness of the material having an olivine structure.

18. The composite cathode active material as claimed in claim 1, wherein the inorganic material has a Mohs hardness of about 1 or more.

19. The composite cathode active material as claimed in claim 1, wherein the inorganic material has an electrical conductivity lower than an electrical conductivity of amorphous carbon.

20. The composite cathode active material as claimed in claim 1, wherein the inorganic material has an electrical conductivity of about $10^{-1}$ S/cm or less.

21. A cathode including the cathode active material as claimed in claim 1.

22. A lithium battery including the cathode as claimed in claim 21.

* * * * *